(12) United States Patent
Noda

(10) Patent No.: US 7,515,358 B2
(45) Date of Patent: Apr. 7, 2009

(54) OPTICAL LENS SYSTEM FOR TAKING IMAGE

(75) Inventor: Sayuri Noda, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 78 days.

(21) Appl. No.: 11/681,167

(22) Filed: Mar. 1, 2007

(65) Prior Publication Data

US 2008/0212205 A1 Sep. 4, 2008

(51) Int. Cl.
*G02B 9/14* (2006.01)
(52) U.S. Cl. ...................... 359/785; 359/784
(58) Field of Classification Search .......... 359/716, 359/754–758, 763, 764, 766, 771–774, 784, 359/785
See application file for complete search history.

(56) References Cited

U.S. PATENT DOCUMENTS 6,985,307 B2 * 1/2006 Do ........................... 359/716
2007/0070525 A1 * 3/2007 Taniyama .................. 359/771

* cited by examiner

*Primary Examiner*—Darryl J Collins
(74) *Attorney, Agent, or Firm*—Banger Shia

(57) ABSTRACT

An optical lens system for taking image, from object side along the optical axis comprises an aperture stop, a first lens element, a second lens element, and a third lens element. The first lens element is a positive meniscus lens element with its convex surface facing the object side. The second lens element is a negative meniscus lens element with its convex surface facing the image side. The third lens element is a positive meniscus lens element with its convex surface facing the object side. The three lens elements are made of plastic, and both surfaces of each lens element are aspheric. The focal length of the optical lens system is f, the focal lens of the first lens element is f1, the focal length of the second lens system is f2, and they satisfy the relations: $0.7 < f1/f < 0.9$ and $-0.35 < f2/f < -1.2$.

5 Claims, 19 Drawing Sheets

FOCAL LENGTH : f=3.54
F NUMBER :F2.83
FIELD OF VIEW :2ω=67.5°

|   | r | d | nd | νd |
|---|---|---|---|---|
| 1 | 1.0486 | 0.515 | 1.52996 | 55.8 |
| 2 | 2.9454 | 0.712 | | |
| 3 | −0.6323 | 0.350 | 1.58340 | 30.2 |
| 4 | −0.8727 | 0.030 | | |
| 5 | 3.4831 | 1.100 | 1.51357 | 56.8 |
| 6 | 4.4440 | 0.511 | | |
| 7 | ∞ | 0.300 | 1.51680 | 64.2 |
| 8 | ∞ | 0.578 | | |

$f_1/f=$ 0.79
$f_2/f=$ −2.39
$d_2/f=$ 0.20
$R_1/R_2=$ 0.36
$R_3/R_4=$ 0.72
$R_5/f=$ 0.98
$f_{12}/f=$ 1.20
$f_2/f_3=$ −0.38

$T/f=$ 1.13
$\alpha=$ 23.2° (MAXIMUM INCIDENT ANGLE)

spherical aberration — astigmatic difference — distortion aberration

FOCAL LENGTH : f=3.58
F NUMBER :F2.91
FIELD OF VIEW :2ω=66.5°

|   | r | d | nd | νd |
|---|---|---|---|---|
| 1 | 0.9456 | 0.651 | 1.52996 | 55.8 |
| 2 | 1.9922 | 0.552 | | |
| 3 | -0.8901 | 0.350 | 1.58340 | 30.2 |
| 4 | -1.2541 | 0.218 | | |
| 5 | 3.4831 | 0.809 | 1.51357 | 56.8 |
| 6 | 3.5970 | 0.250 | | |
| 7 | ∞ | 0.500 | 1.51680 | 64.2 |
| 8 | ∞ | 0.595 | | |

$f_1/f=$ 0.78
$f_2/f=$ -2.27
$d_2/f=$ 0.15
$R_1/R_2=$ 0.47
$R_3/R_4=$ 0.71
$R_5/f=$ 0.97
$f_{12}/f=$ 1.11
$f_2/f_3=$ -0.13

$T/f=$ 1.05
$\alpha =$ 25.3° (MAXIMUM INCIDENT ANGLE)

-0.1　0　0.1
spherical aberration

S　M
-0.1　0　0.1
astigmatic difference

-1　0　1
distortion aberration

FOCAL LENGTH : f=3.31
F NUMBER :F2.93
FIELD OF VIEW :2ω=71.1°

|   | r       | d     | nd      | νd   |
|---|---------|-------|---------|------|
| 1 | 0.9493  | 0.433 | 1.54340 | 56.5 |
| 2 | 2.2247  | 0.625 |         |      |
| 3 | -0.8478 | 0.320 | 1.58340 | 30.2 |
| 4 | -1.1196 | 0.310 |         |      |
| 5 | 2.5438  | 0.719 | 1.51357 | 56.8 |
| 6 | 2.3738  | 0.342 |         |      |
| 7 | ∞       | 0.300 | 1.51680 | 64.2 |
| 8 | ∞       | 0.604 |         |      |

$f_1/f=$ 0.82
$f_2/f=$ -3.19
$d_2/f=$ 0.19
$R_1/R_2=$ 0.43
$R_3/R_4=$ 0.76
$R_5/f=$ 0.77
$f_{12}/f=$ 1.12
$f_2/f_3=$ -0.07

$T/f=$ 1.07
$\alpha=$ 25.1° ( MAXIMUM INCIDENT ANGLE )

FOCAL LENGTH : f=3.03
F NUMBER :F2.92
FIELD OF VIEW :2ω=64.6°

|   | r       | d     | nd      | νd   |
|---|---------|-------|---------|------|
| 1 | 0.9577  | 0.474 | 1.52996 | 55.8 |
| 2 | 4.0427  | 0.492 |         |      |
| 3 | -0.6604 | 0.320 | 1.58340 | 30.2 |
| 4 | -0.9490 | 0.297 |         |      |
| 5 | 2.0598  | 0.584 | 1.51357 | 56.8 |
| 6 | 1.9889  | 0.379 |         |      |
| 7 | ∞       | 0.300 | 1.51680 | 64.2 |
| 8 | ∞       | 0.547 |         |      |

$f_1/f=$ 0.74
$f_2/f=$ -2.08
$d_2/f=$ 0.16
$R_1/R_2=$ 0.24
$R_3/R_4=$ 0.70
$R_5/f=$ 0.68
$f_{12}/f=$ 1.13
$f_2/f_3=$ -0.10

$T/f=$ 1.09
$\alpha =$ 23.9° ( MAXIMUM INCIDENT ANGLE )

FOCAL LENGTH : f=3.54
F NUMBER :F2.81
FIELD OF VIEW :2ω=66.2°

|   | r       | d     | nd      | νd   |
|---|---------|-------|---------|------|
| 1 | 1.0116  | 0.524 | 1.52996 | 55.8 |
| 2 | 2.9408  | 0.649 |         |      |
| 3 | -0.6492 | 0.350 | 1.58340 | 30.2 |
| 4 | -0.9795 | 0.030 |         |      |
| 5 | 3.4831  | 1.205 | 1.51357 | 56.8 |
| 6 | 6.9618  | 0.471 |         |      |
| 7 | ∞       | 0.300 | 1.51680 | 64.2 |
| 8 | ∞       | 0.592 |         |      |

$f_1/f=$ 0.75
$f_2/f=$ -1.53
$d_2/f=$ 0.18
$R_1/R_2=$ 0.34
$R_3/R_4=$ 0.66
$R_5/f=$ 0.98
$f_{12}/f=$ 1.28
$f_2/f_3=$ -0.45

$T/f=$ 1.13
$\alpha=$ 23.0° ( MAXIMUM INCIDENT ANGLE )

spherical aberration    astigmatic difference    distortion aberration

FOCAL LENGTH : f=3.35
F NUMBER : F2.94
FIELD OF VIEW : 2ω=69.4°

|   | r       | d     | nd      | νd   |
|---|---------|-------|---------|------|
| 1 | 0.8683  | 0.458 | 1.54340 | 56.5 |
| 2 | 1.7603  | 0.625 |         |      |
| 3 | -0.7970 | 0.320 | 1.58340 | 30.2 |
| 4 | -1.0840 | 0.270 |         |      |
| 5 | 2.4374  | 0.715 | 1.51357 | 56.8 |
| 6 | 2.2406  | 0.312 |         |      |
| 7 | ∞       | 0.300 | 1.51680 | 64.2 |
| 8 | ∞       | 0.605 |         |      |

$f_1/f=$ 0.80
$f_2/f=$ -2.61
$d_2/f=$ 0.19
$R_1/R_2=$ 0.49
$R_3/R_4=$ 0.74
$R_5/f=$ 0.73
$f_{12}/f=$ 1.12
$f_2/f_3=$ -0.04

$T/f=$ 1.05
$\alpha=$ 25.1° (MAXIMUM INCIDENT ANGLE)

-0.1　0　0.1
spherical aberration

-0.1　0　0.1
astigmatic difference

-1　0　1
distortion aberration

FOCAL LENGTH : f=3.41
F NUMBER :F2.94
FIELD OF VIEW :2ω=68.7°

|   | r       | d     | nd      | νd   |
|---|---------|-------|---------|------|
| 1 | 0.8367  | 0.476 | 1.54340 | 56.5 |
| 2 | 1.6659  | 0.625 |         |      |
| 3 | -0.7477 | 0.310 | 1.58340 | 30.2 |
| 4 | -1.1201 | 0.190 |         |      |
| 5 | 2.7676  | 0.787 | 1.51357 | 56.8 |
| 6 | 3.3887  | 0.312 |         |      |
| 7 | ∞       | 0.300 | 1.51680 | 64.2 |
| 8 | ∞       | 0.585 |         |      |

$f_1/f$ = 0.76
$f_2/f$ = -1.63
$d_2/f$ = 0.18
$R_1/R_2$ = 0.50
$R_3/R_4$ = 0.67
$R_5/f$ = 0.81
$f_{12}/f$ = 1.18
$f_2/f_3$ = -0.27

$T/f$ = 1.02
$\alpha$ = 25.1° (MAXIMUM INCIDENT ANGLE)

FOCAL LENGTH : f=3.03
F NUMBER :F2.92
FIELD OF VIEW :2ω=63.2°

|   | r       | d     | nd      | νd   |
|---|---------|-------|---------|------|
| 1 | 0.9557  | 0.477 | 1.52996 | 55.8 |
| 2 | 3.9587  | 0.496 |         |      |
| 3 | -0.6608 | 0.320 | 1.58340 | 30.2 |
| 4 | -0.9492 | 0.293 |         |      |
| 5 | 2.0381  | 0.584 | 1.51357 | 56.8 |
| 6 | 1.9640  | 0.378 |         |      |
| 7 | ∞       | 0.300 | 1.51680 | 64.2 |
| 8 | ∞       | 0.544 |         |      |

$f_1/f=$ 0.74
$f_2/f=$ -2.08
$d_2/f=$ 0.16
$R_1/R_2=$ 0.24
$R_3/R_4=$ 0.70
$R_5/f=$ 0.67
$f_{12}/f=$ 1.13
$f_2/f_3=$ -0.10

T/f= 1.09
α = 23.9° (MAXIMUM INCIDENT ANGLE)

spherical aberration   astigmatic difference   distortion aberration (Embodiment 1) aspherical coefficient surface No. 1
- K= 6.21858E-03
- A= 3.90146E-02
- B= -1.25896E-01
- C= 9.79722E-01
- D= -1.78556E+00
- E= -2.61992E+00 surface No. 2
- K= 3.57386E+00
- A= 3.36092E-02
- B= 2.31627E-01
- C= -1.23148E+00
- D= 2.79905E+00
- E= 9.19375E-01 surface No. 3
- K= -1.38832E-01
- A= 6.59929E-01
- B= -4.20126E-02
- C= 2.43106E+00
- D= -8.86080E+00
- E= 3.96660E+01 surface No. 4
- K= -5.95018E-01
- A= 2.55348E-01
- B= 2.38669E-01
- C= -1.44535E-01
- D= 6.16812E-01
- E= -1.12606E+00 surface No. 5
- K= -3.95309E+01
- A= -5.38872E-02
- B= 8.50022E-02
- C= -7.22086E-02
- D= 3.99048E-02
- E= -1.33047E-02 surface No. 6
- K= -4.17636E+01
- A= -1.07787E-01
- B= 5.23495E-02
- C= -2.09066E-02
- D= 4.80041E-03
- E= -1.22162E-03

(Embodiment 2) aspherical coefficient surface No. 1
- K= 6.21858E-03
- A= 4.92954E-02
- B= -1.48563E-01
- C= 1.15073E+00
- D= -2.06788E+00
- E= -2.12744E+00 surface No. 2
- K= 5.02539E-01
- A= 1.18021E-01
- B= 1.09147E+00
- C= -7.07074E+00
- D= 2.60570E+01
- E= 1.42272E+01 surface No. 3
- K= 5.67983E-01
- A= 1.51557E-01
- B= 1.69466E-01
- C= 9.07086E-01
- D= -1.75920E+00
- E= 4.55494E-01 surface No. 4
- K= 6.28676E-01
- A= 1.81447E-02
- B= 4.23055E-01
- C= -3.22843E-01
- D= 9.22185E-01
- E= -1.13652E+00 surface No. 5
- K= -4.03562E+01
- A= -1.54404E-01
- B= 1.59264E-01
- C= -9.66833E-02
- D= 3.98209E-02
- E= -1.12392E-02 surface No. 6
- K= -1.64419E+01
- A= -1.20499E-01
- B= 4.61007E-02
- C= -1.74812E-02
- D= 4.72910E-03
- E= -1.41880E-03

(Embodiment 3) aspherical coefficient surface No. 1
- K= -2.66197E+00
- A= 4.89143E-01
- B= -8.31072E-01
- C= 6.26345E+00
- D= -2.00261E+01
- E= 2.27846E+01 surface No. 2
- K= -2.05344E+00
- A= 1.28399E-01
- B= 6.73914E-01
- C= -3.54125E+00
- D= -9.27121E+00
- E= 2.28482E+02 surface No. 3
- K= 5.83680E-01
- A= 5.39130E-02
- B= -3.25001E-01
- C= 2.77910E+00
- D= -1.75930E+00
- E= 4.55285E-01 surface No. 4
- K= 6.27078E-01
- A= -1.82827E-01
- B= 7.99369E-01
- C= -1.65233E+00
- D= 5.27761E+00
- E= -4.77954E+00 surface No. 5
- K= -3.78187E+01
- A= -2.56668E-01
- B= 1.54222E-01
- C= 1.34748E-02
- D= -7.15545E-02
- E= 2.82732E-02 surface No. 6
- K= -2.64614E+01
- A= -9.90850E-02
- B= -2.03487E-02
- C= 3.76883E-02
- D= -1.32466E-02
- E= -4.12699E-03

FIG. 9A (Embodiment 4) aspherical coefficient

| surface No. 1 | surface No. 2 | surface No. 3 |
|---|---|---|
| K= −7.96971E+00 | K= −1.90794E+01 | K= 2.32308E−02 |
| A= 1.09126E+00 | A= −7.43096E−02 | A= −1.05629E−01 |
| B= −2.59083E+00 | B= 1.01193E+00 | B= 2.14529E+00 |
| C= 3.09180E+00 | C= −1.56618E+01 | C= 1.33782E+00 |
| D= 2.18563E+01 | D= 8.77125E+01 | D= −1.18516E+01 |
| E= −1.26989E+02 | E= −2.68622E+02 | E= 4.68866E+00 |

| surface No. 4 | surface No. 5 | surface No. 6 |
|---|---|---|
| K= 4.32478E−01 | K= −3.98349E+01 | K= −2.48801E+01 |
| A= −3.59459E−01 | A= −4.24462E−01 | A= −2.49390E−01 |
| B= 3.67557E+00 | B= 8.00771E−01 | B= 1.74799E−01 |
| C= −1.00042E+01 | C= −8.40785E−01 | C= −7.68649E−02 |
| D= 3.22315E+01 | D= 4.13750E−01 | D= −2.73945E−03 |
| E= −6.27207E+01 | E= −2.57284E−02 | E= 9.56837E−03 |

(Embodiment 5) aspherical coefficient

| surface No. 1 | surface No. 2 | surface No. 3 |
|---|---|---|
| K= 6.21858E−03 | K= −5.51106E+00 | K= −3.43875E−03 |
| A= −7.44430E−03 | A= 1.30487E−01 | A= 6.92103E−01 |
| B= 6.06311E−01 | B= −3.93520E−01 | B= 6.18308E−01 |
| C= −3.46492E+00 | C= 3.02599E+00 | C= 4.20098E−01 |
| D= 9.49612E+00 | D= −1.29856E+01 | D= −9.38517E+00 |
| E= −6.15919E+00 | E= 2.98397E+01 | E= 4.55507E+01 |

| surface No. 4 | surface No. 5 | surface No. 6 |
|---|---|---|
| K= −1.59603E+00 | K= −5.60044E+00 | K= −4.17636E+01 |
| A= 2.44612E−01 | A= −4.11707E−02 | A= −1.14405E−01 |
| B= 2.45334E−01 | B= 4.39689E−02 | B= 7.07707E−02 |
| C= −5.23345E−01 | C= −4.42903E−02 | C= −3.46081E−02 |
| D= 5.41150E−01 | D= 3.95250E−02 | D= 9.77121E−03 |
| E= −4.33933E−01 | E= −2.21927E−02 | E= −1.73546E−03 |

(Embodiment 6) aspherical coefficient

| surface No. 1 | surface No. 2 | surface No. 3 |
|---|---|---|
| K= −2.25156E+00 | K= −1.30014E+00 | K= 4.51224E−01 |
| A= 5.37184E−01 | A= 2.69415E−01 | A= 1.03244E−01 |
| B= −5.34451E−01 | B= 3.81614E−01 | B= −4.81913E−01 |
| C= 5.39707E+00 | C= 1.19776E+00 | C= 3.37971E+00 |
| D= −1.77276E+01 | D= −1.15766E+00 | D= −1.75930E+00 |
| E= 2.69957E+01 | E= 1.94475E+01 | E= 4.55285E−01 |

| surface No. 4 | surface No. 5 | surface No. 6 |
|---|---|---|
| K= −3.00877E−01 | K= −4.41532E+01 | K= −2.79071E+01 |
| A= −2.77153E−01 | A= −2.71359E−01 | A= −1.09227E−01 |
| B= 7.87842E−01 | B= 1.47832E−01 | B= −1.61253E−02 |
| C= −2.33245E+00 | C= 3.00951E−02 | C= 3.36451E−02 |
| D= 6.64183E+00 | D= −6.43383E−02 | D= −1.11288E−02 |
| E= −4.76806E+00 | E= 2.57542E−02 | E= −4.12849E−03 |

FIG. 9B (Embodiment 7) aspherical coefficient surface No. 1
- K= −2.37397E+00
- A= 6.22318E−01
- B= −6.72048E−01
- C= 5.44896E+00
- D= −1.62418E+01
- E= 2.68338E+01 surface No. 2
- K= −2.54344E+00
- A= 3.63125E−01
- B= −4.19329E−02
- C= 2.35712E+00
- D= 1.11082E+01
- E= 1.47667E+01 surface No. 3
- K= 4.51224E−01
- A= 4.08461E−01
- B= −1.52906E+00
- C= 5.48295E+00
- D= −1.75930E+00
- E= 4.55285E−01 surface No. 4
- K= 4.32464E−01
- A= −1.96038E−01
- B= 1.00842E+00
- C= −2.60205E+00
- D= 6.25606E+00
- E= −4.29453E+00 surface No. 5
- K= −8.39967E+01
- A= −2.20064E−01
- B= 1.25646E−01
- C= 2.61655E−02
- D= −6.14105E−02
- E= 2.76281E−02 surface No. 6
- K= −6.99792E+01
- A= −7.87226E−02
- B= −3.70688E−02
- C= 3.69765E−02
- D= −9.32625E−03
- E= −4.49968E−03

(Embodiment 8) aspherical coefficient surface No. 1
- K= −8.13928E+00
- A= 1.11600E+00
- B= −2.67885E+00
- C= 3.17028E+00
- D= 2.25693E+01
- E= −1.28601E+02 surface No. 2
- K= −1.77665E+01
- A= −6.82254E−02
- B= 9.81199E−01
- C= −1.54942E+01
- D= 8.74233E+01
- E= −2.68448E+02 surface No. 3
- K= 3.88680E−02
- A= −1.11433E−01
- B= 2.12226E+00
- C= 1.46533E+00
- D= −1.18516E+01
- E= 4.68866E+00 surface No. 4
- K= 4.34927E−01
- A= −3.76565E−01
- B= 3.67825E+00
- C= −9.96452E+00
- D= 3.21364E+01
- E= −6.26331E+01 surface No. 5
- K= −4.03562E+01
- A= −4.29395E−01
- B= 8.09326E−01
- C= −8.44799E−01
- D= 4.12752E−01
- E= −2.42477E−02 surface No. 6
- K= −2.51224E+01
- A= −2.48767E−01
- B= 1.73886E−01
- C= −7.71160E−02
- D= −2.04002E−03
- E= 1.00044E−02

FIG. 9C

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in digital cameras, mobile phones or PDA products.

2. Description of the Prior Art

With the miniaturization of digital cameras, mobile phones and PDA products, the inner optical lens system for taking image is required to be miniaturized as much as possible. And the development of an image sensor such as CCD (Charge Coupled Device) or CMOS (Complementary Metal Oxide Semiconductor) used in an optical lens system for taking image is toward the miniaturization and high resolution field. Therefore, an optical lens system in the future must satisfy the requirement of miniaturization and high resolution.

If the size of an optical lens system is miniaturized, and it must insert a glass cover and an IR Cut filter in the optical lens system, causing difficulty in ensuring a necessary back focal length, and the total optical length of the optical lens system will be too long. Further, when the total optical length of an ordinary optical lens system is shortened, the characteristic of an incident angle of the optical lens system will get worse.

Therefore, JP Pat. Nos. 2005-004045, 2005-227755, 2005-345919, 2005-352206, 2006-106321, 2006-133270 and 2006-163340 disclosed several improved projects, which adopt lens elements for taking image smaller than usual lens elements, and the aperture stop is located at the object side, so that the exit pupil of the optical lens system will be far away from the image plane. A three-piece lens system that can ensure a good characteristic of an incident angle and is made of plastic material and has aspheric shape with inflection point.

The disadvantages of the abovementioned projects lie in:

The magnification of the JP Pat. No. 2005-004045 is as great as 1.35~1.48 (magnification is the ratio of the focal length to the entire optical length), which restricts the design for miniaturization.

JP Pat. No. 2005-227755 also ensures a back focal length, and the magnification is 1.19, which satisfies the requirement of miniaturization, but the field of view is as small as 58 degrees.

The magnification of the JP Pat. No. 2005-345919 is as great as 1.35~1.48

The magnification of the JP Pat. No. 2005-352206 is as great as 1.38.

The product of the JP Pat. No. 2006-106321 satisfies the requirement of miniaturization, but the field of view as small as 58 degrees.

The product of the JP Pat. No. 2006-133270 satisfies the requirement of miniaturization, but the Fno is 3.85, so that the resultant brightness is relatively low.

The product of the JP Pat. No. 2006-163340 will produce a magnification as great as 1.3.

In view of abovementioned conventional projects, the present invention developed a product that satisfies the requirement of miniaturization and produces a smaller magnification by using only three lens elements to ensure the field of view.

The present invention has arisen to mitigate and/or obviate the afore-described disadvantages.

SUMMARY OF THE INVENTION

The primary objective of the present invention is to provide a three-piece lens system that can produce a smaller magnification and ensure the field of view.

To achieve the abovementioned objective, the optical lens system for taking image, from object side along the optical axis comprises: an aperture stop, a first lens element, a second lens element and a third lens element, wherein:

A first lens element is a positive meniscus lens element with its convex surface facing the object side;

A second lens element is a negative meniscus lens element with its convex surface facing the image side; and A third lens element is a positive meniscus lens element with its convex surface facing the object side.

The abovementioned three lens elements have an aspheric surface respectively and are all made of plastic material. The total length of the optical lens system is f, the focal length of the first lens element is f1, and the focal length of the second lens element is f2, and they satisfy the relations: $0.7 < f1/f < 0.9$ and $-3.5 < f2/f < -1.2$.

The optical lens system of the present invention comprises a first lens element, a second lens element and a third lens element (called three-piece lens system). The three lens elements are made of plastic, and both surfaces of each lens elements are aspheric. The arrangement of the three lens elements can control the magnification so as to realize miniaturization effectively.

When the optical lens system of the present invention satisfies the relations: $0.7 < f1/f < 0.9$ and $-3.5 < f2/f < -1.2$, the characteristic of the incident angle can be ensured, and the magnification can be controlled in order to ensure the field of view, and the aberration can be corrected effectively.

If the value of f1/f is smaller than 0.7, the refractive power of the first lens element will become too strong, and as a result, the multiple power of the spherical aberration and coma aberration will not be good.

If the value of f1/f is higher than 0.9, the positive refractive power of the second lens element will become weak, and the total length of the optical lens system will become long.

In addition, if the value of f2/f is smaller than −3.5, the refractive power of the second lens element becomes too small, and chromatic aberration of magnification becomes difficult to correct.

If the value of f2/f is higher than −1.2, image aberration will not be good, so that the aberration caused cannot be corrected effectively.

Moreover, the focal length of the optical lens system is f, and the distance between the first lens element and the second lens element is d2, and they satisfy the relation: $0.10 < d2/f < 0.25$. If the value of d2/f is smaller than 0.1, the distance between the first lens element with positive refractive power and the second lens element with negative refractive power will become too narrow; the equalization of off axis performance will not be good and the aberration can not be corrected effectively. If the value of d2/f is higher than 0.25, the distance between the first lens element and the second lens element will become too wide, and the outer diameter of the third lens element accordingly becomes large, so that it will adversely affect the effect of miniaturization, In addition, the coma flare will also increase.

The radius of curvature of the object side surface of the first lens element is R1, and the radius of curvature of the image side surface of the first lens element is R2, and they satisfy the relation: $0.20 < R1/R2 < 0.55$. If the value of R1/R2 is smaller than 0.2, the spherical aberration will become large, and the back focal length will become longer than necessary. If the value of R1/R2 is higher than 0.55, the back focal length will become short, so that the characteristic of the incident angle will not be good.

The radius of curvature of the object side surface of the second lens element is R3, and the radius of curvature of the image side surface of the second lens element is R4, and they satisfy the relation: $0.6<R3/R4<0.8$. If he value of R3/R4 is smaller than 0.6, the image plane will curve, and the coma aberration will be excessively corrected, so that the performance of the optical lens system will be worse. If the value of R3/R4 is higher than 0.8, the image plane will curve, and the coma aberration will not be sufficiently corrected, so that the performance will not be good.

The focal length of the optical lens system is f, the radius of curvature of the object side surface of the third lens element is R5, and they satisfy the relation: $0.6<R5/f<1.1$. If the value of R5/f is smaller than 0.6, the radius of curvature of the object side surface of the third lens element L3 will become too small, and the periphery of the third lens element forms a shape that leans to the image side, so that the back focal length cannot be ensured. In addition, such a shape causes strong ghost along with the total reflection. If the value of R5/f is higher than 1.1, the characteristic of the incident angle get worse, if it is corrected, the coma aberration will get worse.

The focal length of the optical lens system is f, a combined focal length of the first lens element and the second lens element is f12, and the satisfy the relation: $1.0<f12/f<1.4$.

If the value of f12/f is smaller than 1.0, combined refractive power of the first lens element and the second lens element will become too strong, and the back focal length will be shortened. In addition, the characteristic of the incident angle will not be good. If the value of f12/f is higher than 1.4, the characteristic of the incident angle will become better because the exit pupil is separated from the image plane, but the field of view will become narrow.

The focal length of the second lens element is f2, the focal length of the third lens element is f3, and they satisfy the relation: $-0.5<f2/f3<0.0$. If the value of f2/f3 is smaller than −0.5, the negative refractive power of the second lens element will become too strong, so that an even chromatic aberration of magnification cannot be achieved. If the value of f2/f3 is higher than 0.0, the positive refractive power of the third lens element will disappear, and the characteristic of the incident angle will become not good.

BRIEF DESCRIPTION OF THE DRAWINGS

FIG. 9A shows the aspherical coefficients of the imaging lens arrays in accordance with the first, second and third embodiments of the present invention;

FIG. 9B shows the aspherical coefficients of the imaging lens arrays in accordance with the fourth, fifth and sixth embodiments of the present invention; and FIG. 9C shows the aspherical coefficients of the imaging lens arrays in accordance with the seventh and eighth embodiments of the present invention.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1A:
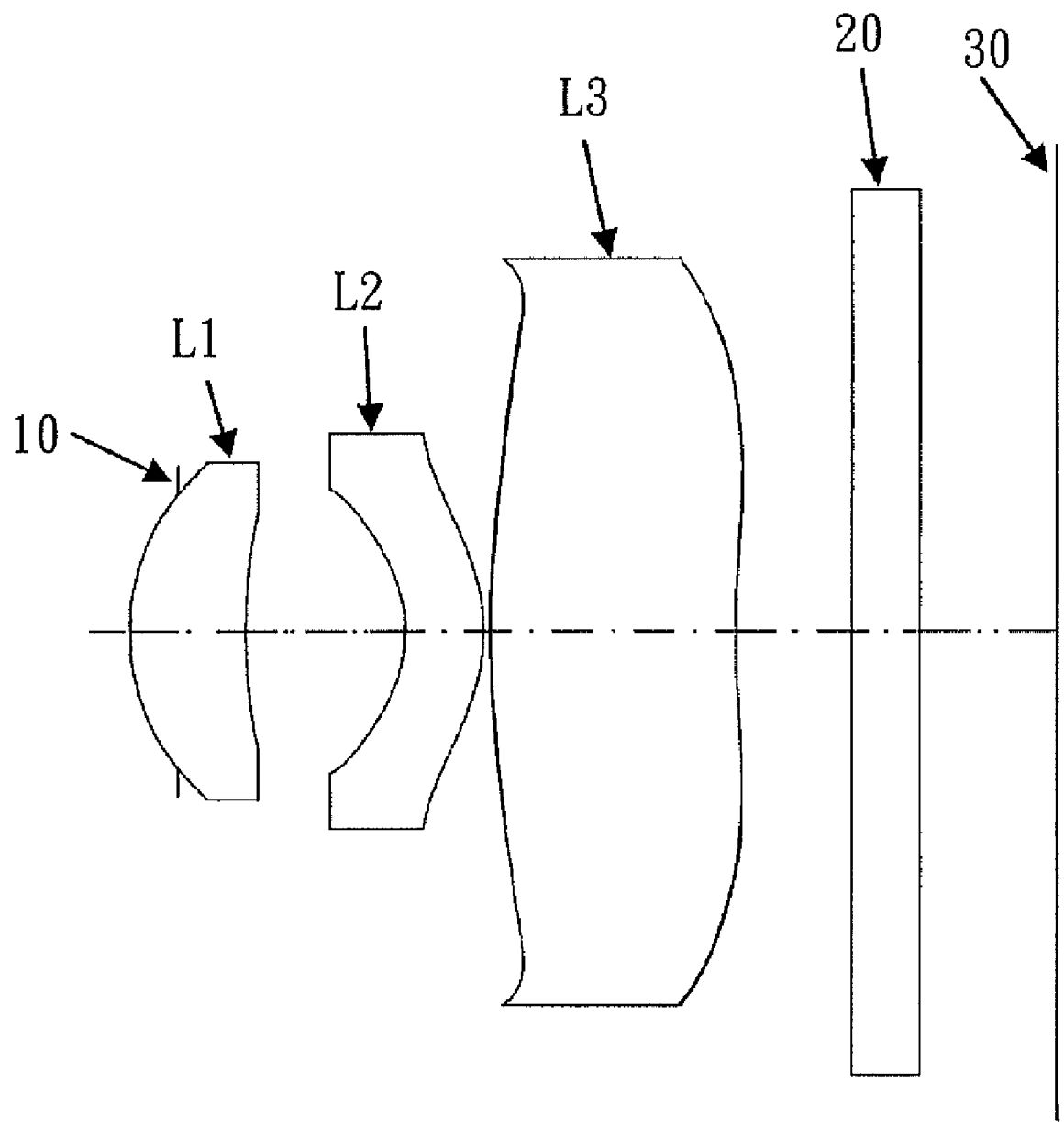
FIG. 1A shows an image lens array in accordance with a first embodiment of the present invention.
Figure 1B:
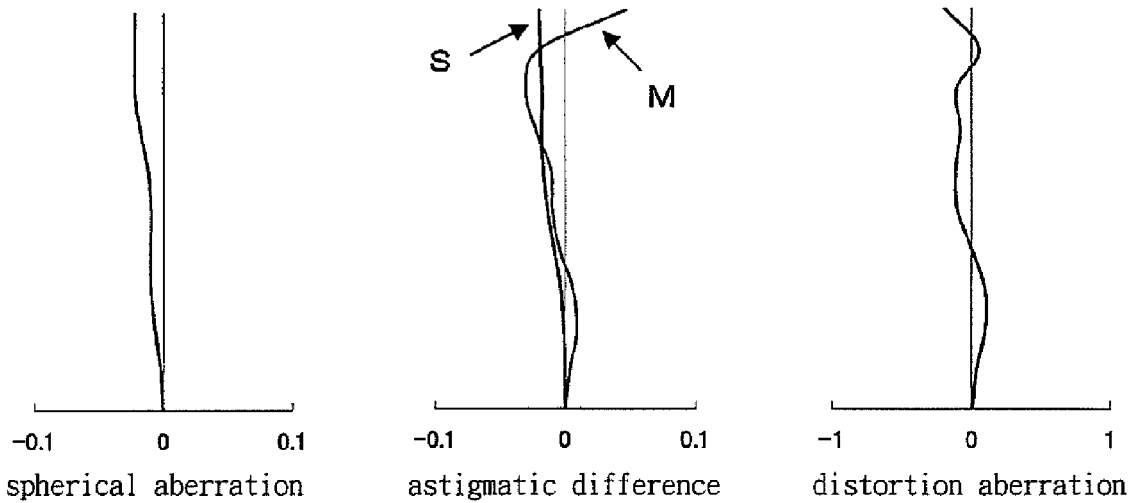
FIG. 1B shows the real numerical values of the respective lens of the first embodiment.
Figure 2A:
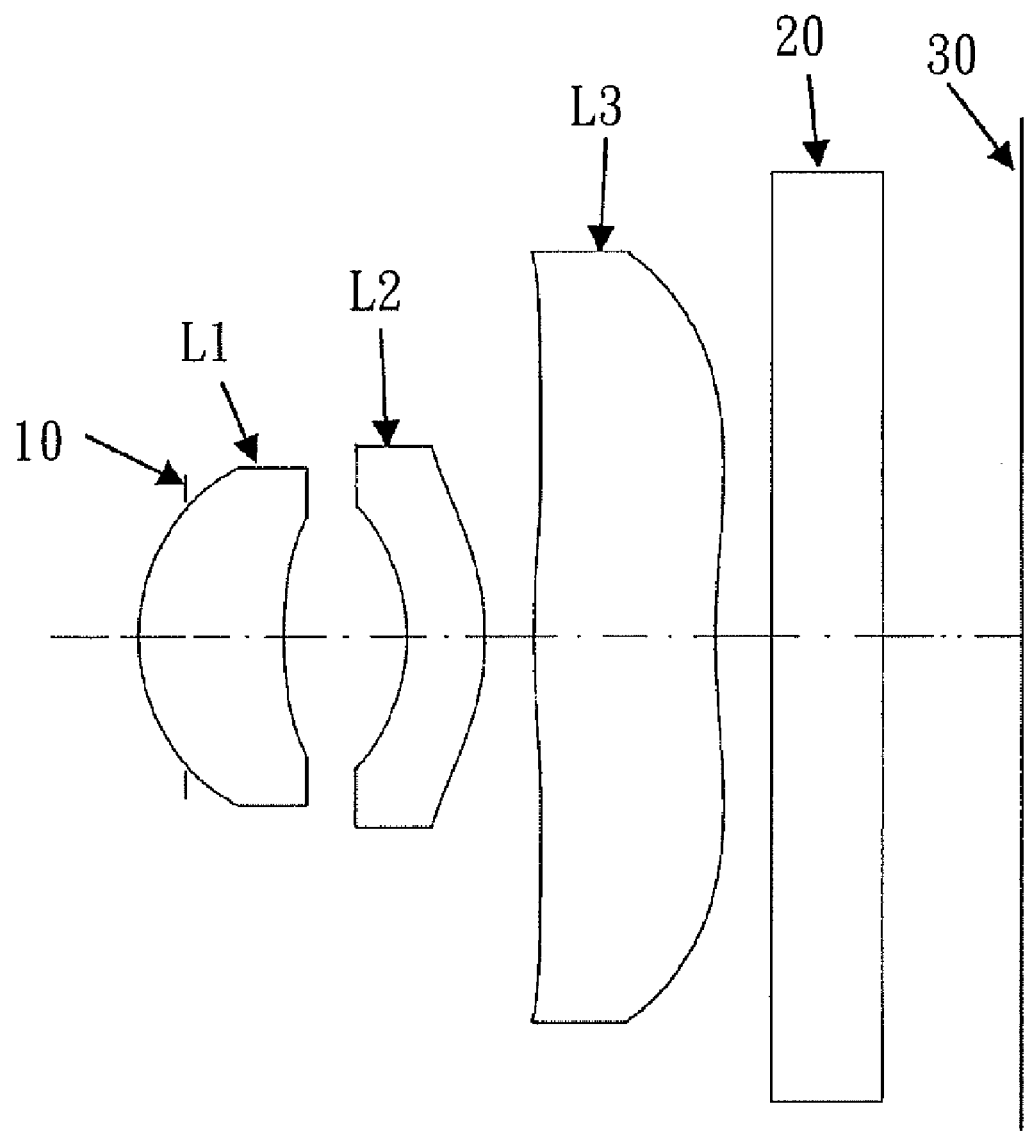
FIG. 2A shows an image lens array in accordance with a second embodiment of the present invention.
Figure 2B:
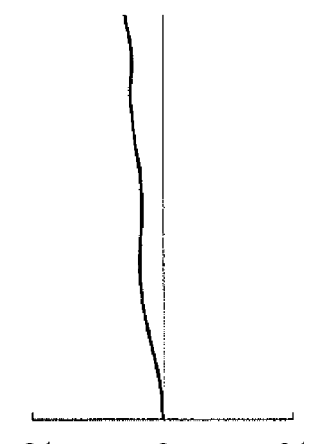
FIG. 2B shows the real numerical values of the respective lens of the second embodiment.
Figure 2B:
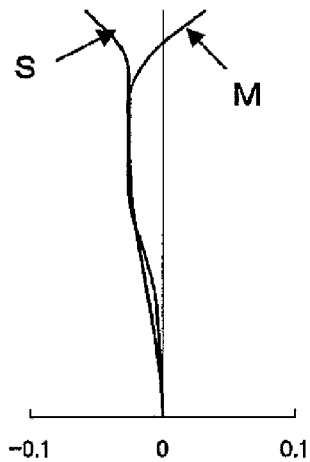
Figure 2B:
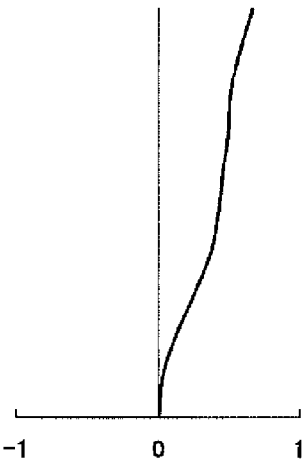
Figure 3A:
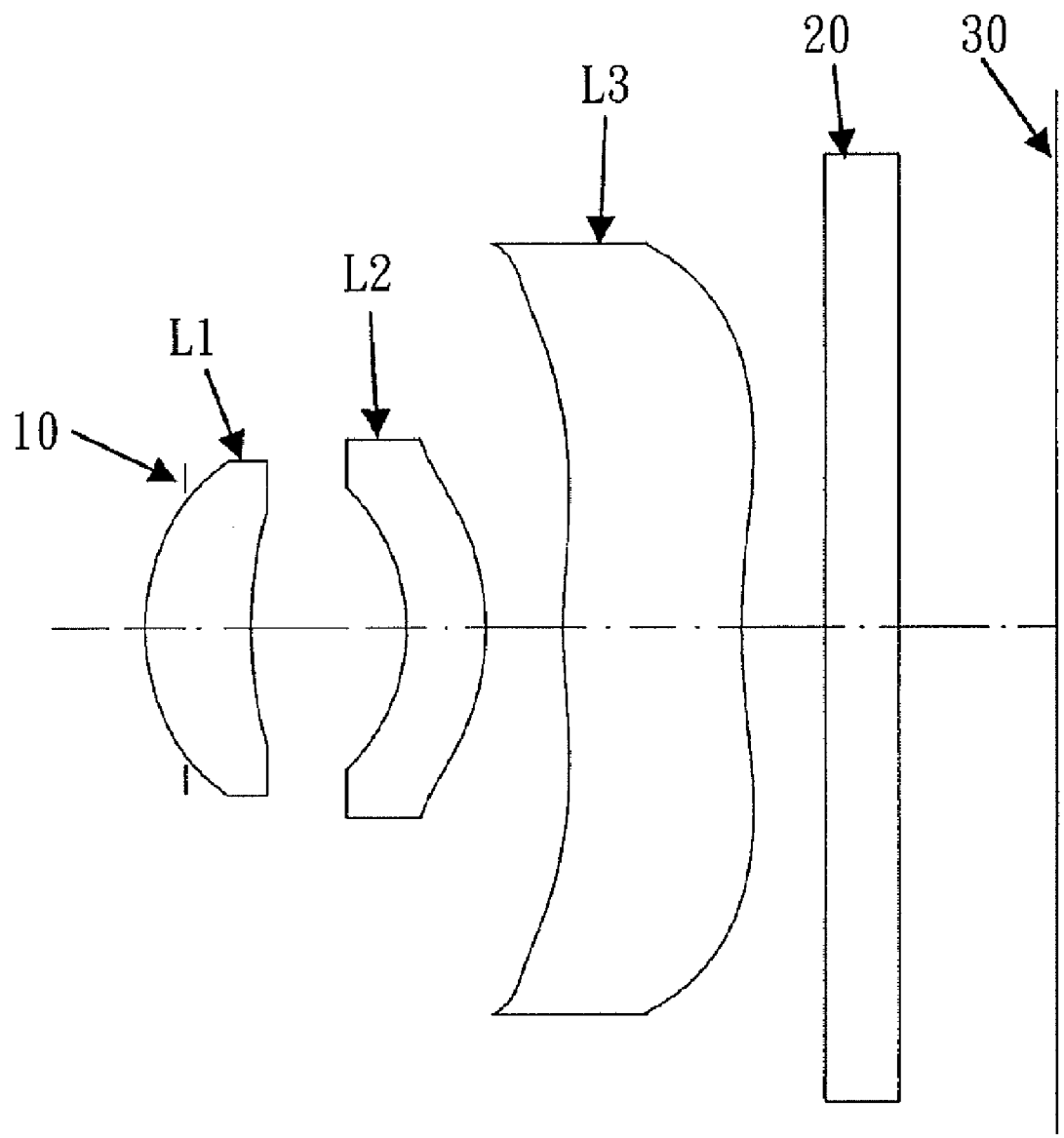
FIG. 3A shows an image lens array in accordance with a third embodiment of the present invention.
Figure 3B:
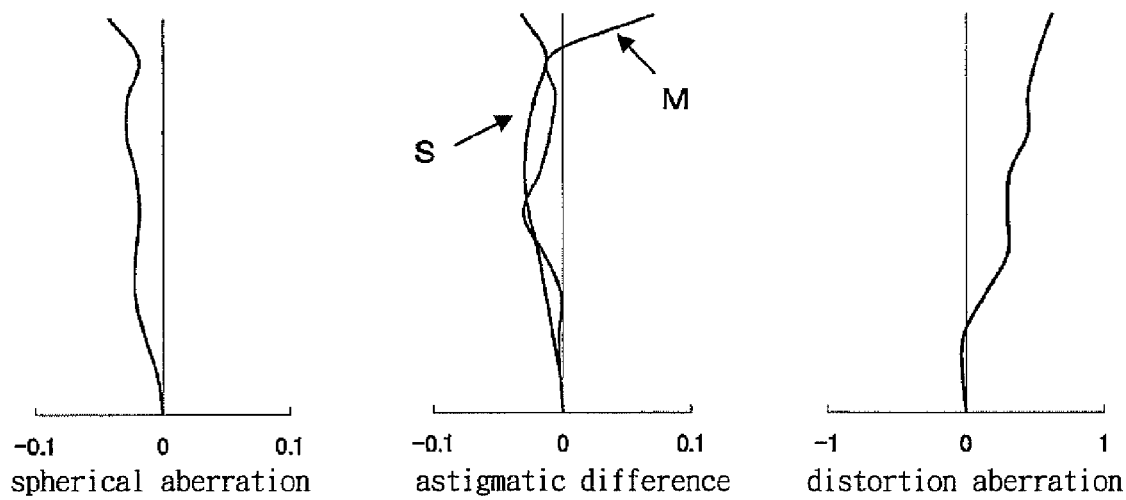
FIG. 3B shows the real numerical values of the respective lens of the third embodiment.
Figure 4A:
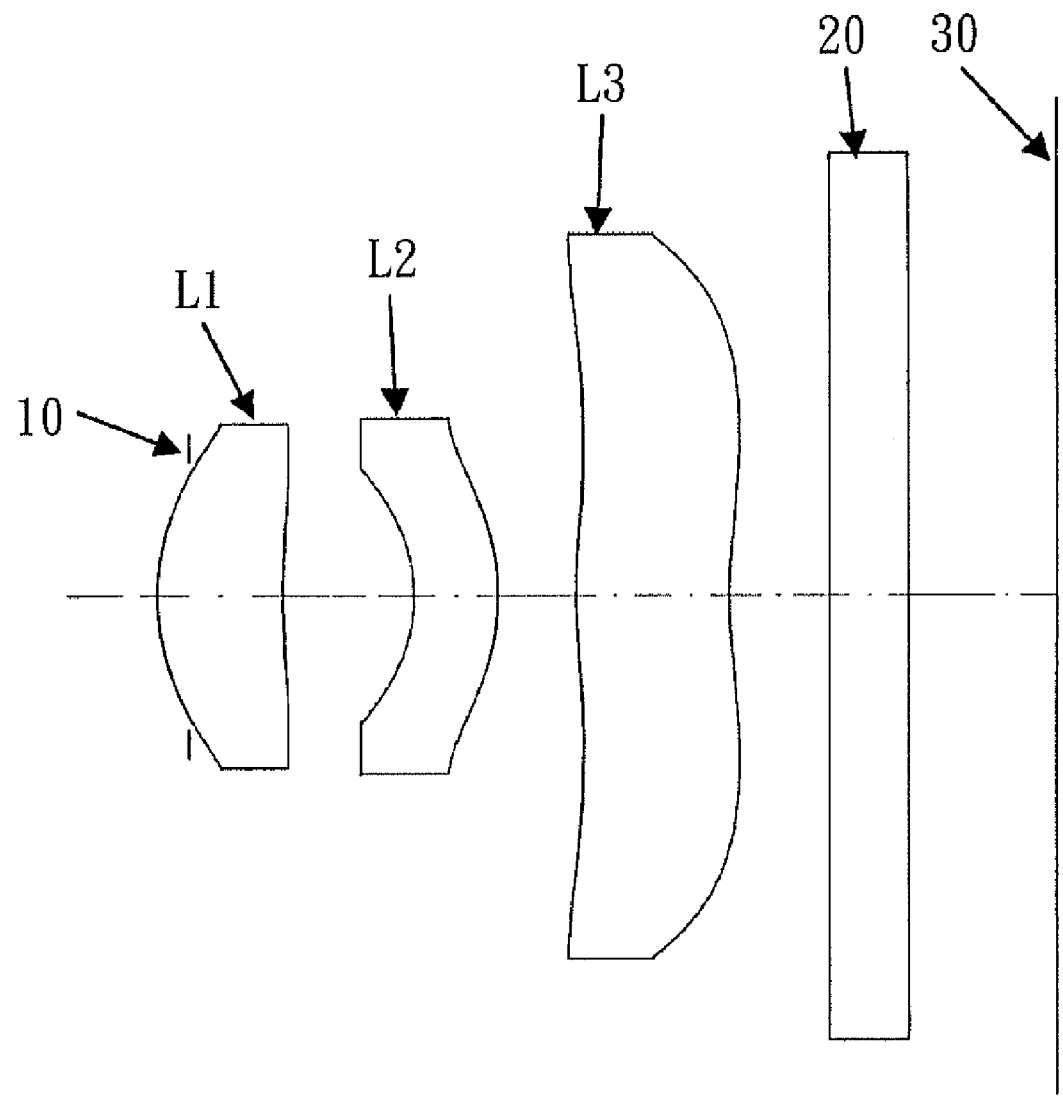
FIG. 4A shows an image lens array in accordance with a fourth embodiment of the present invention.
Figure 4B:
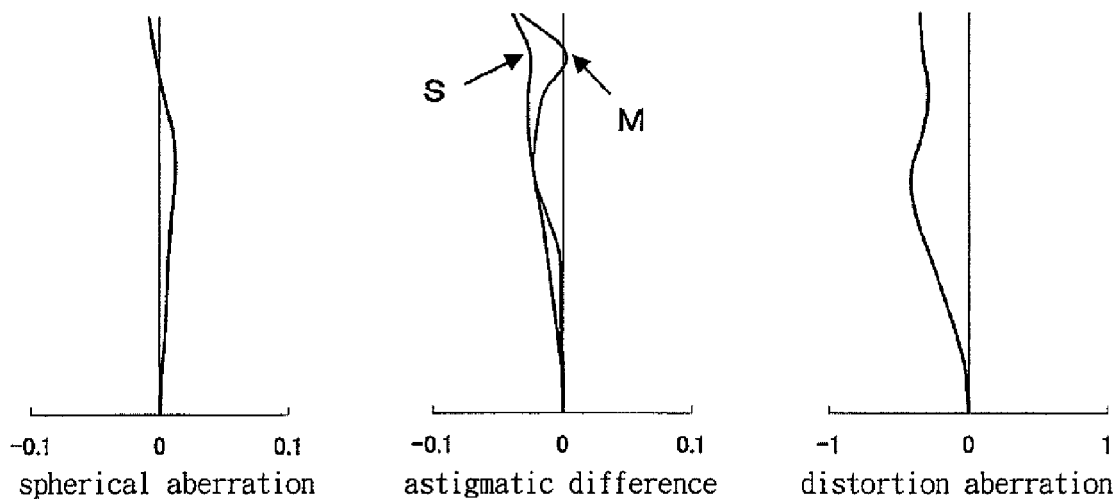
FIG. 4B shows the real numerical values of the respective lens of the fourth embodiment.
Figure 5A:
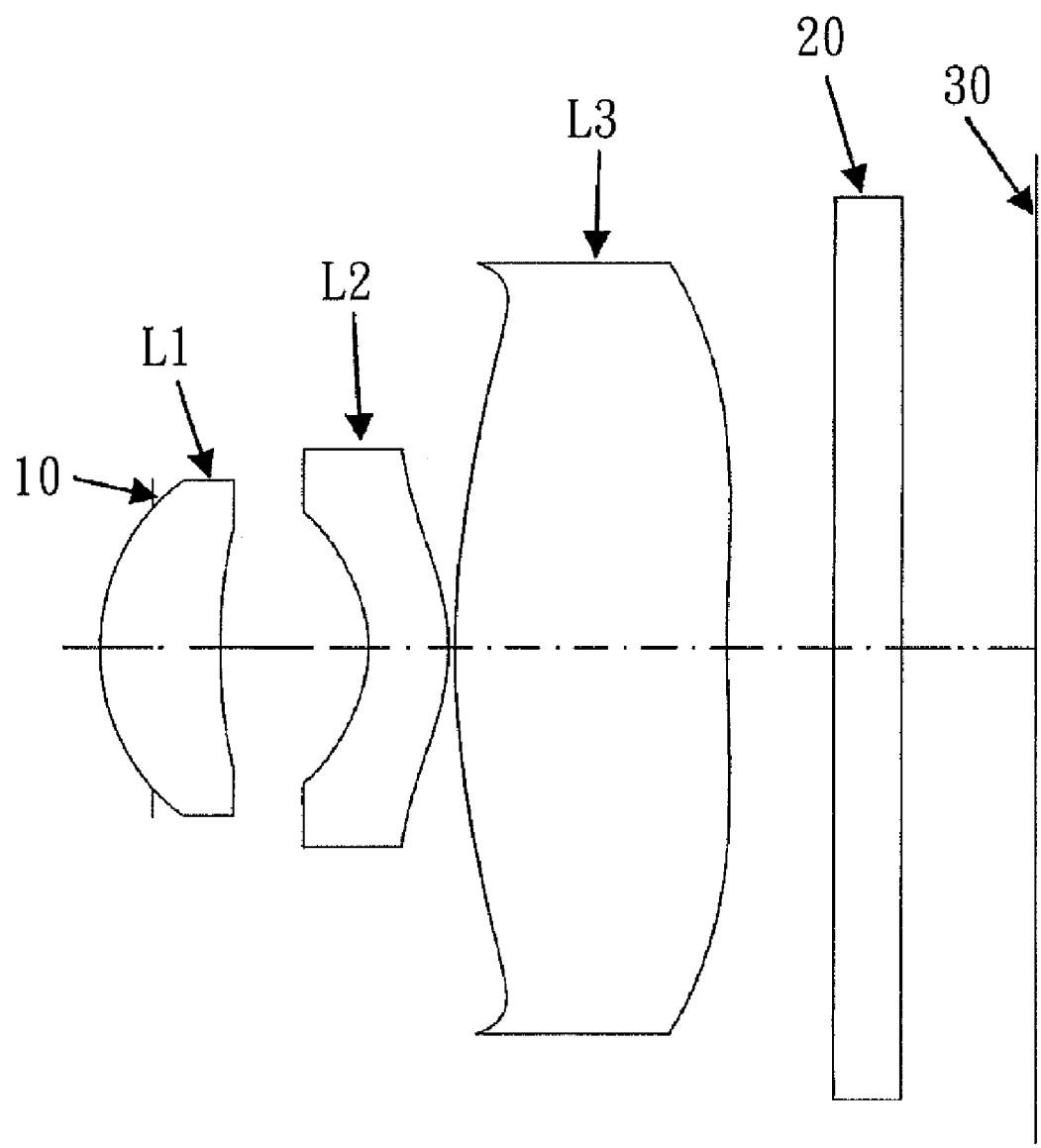
FIG. 5A shows an image lens array in accordance with a fifth embodiment of the present invention.
Figure 5B:
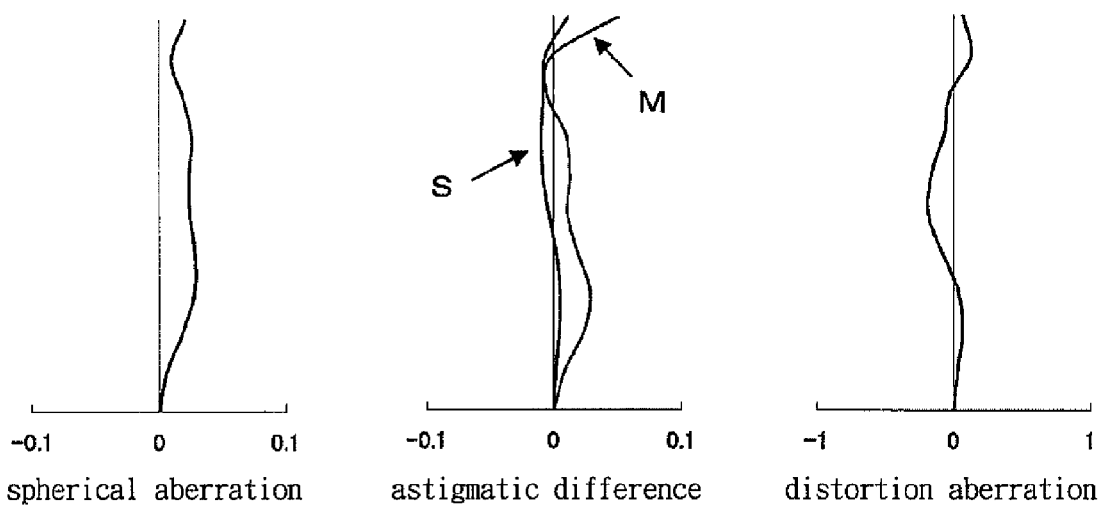
FIG. 5B shows the real numerical values of the respective lens of the fifth embodiment.
Figure 6A:
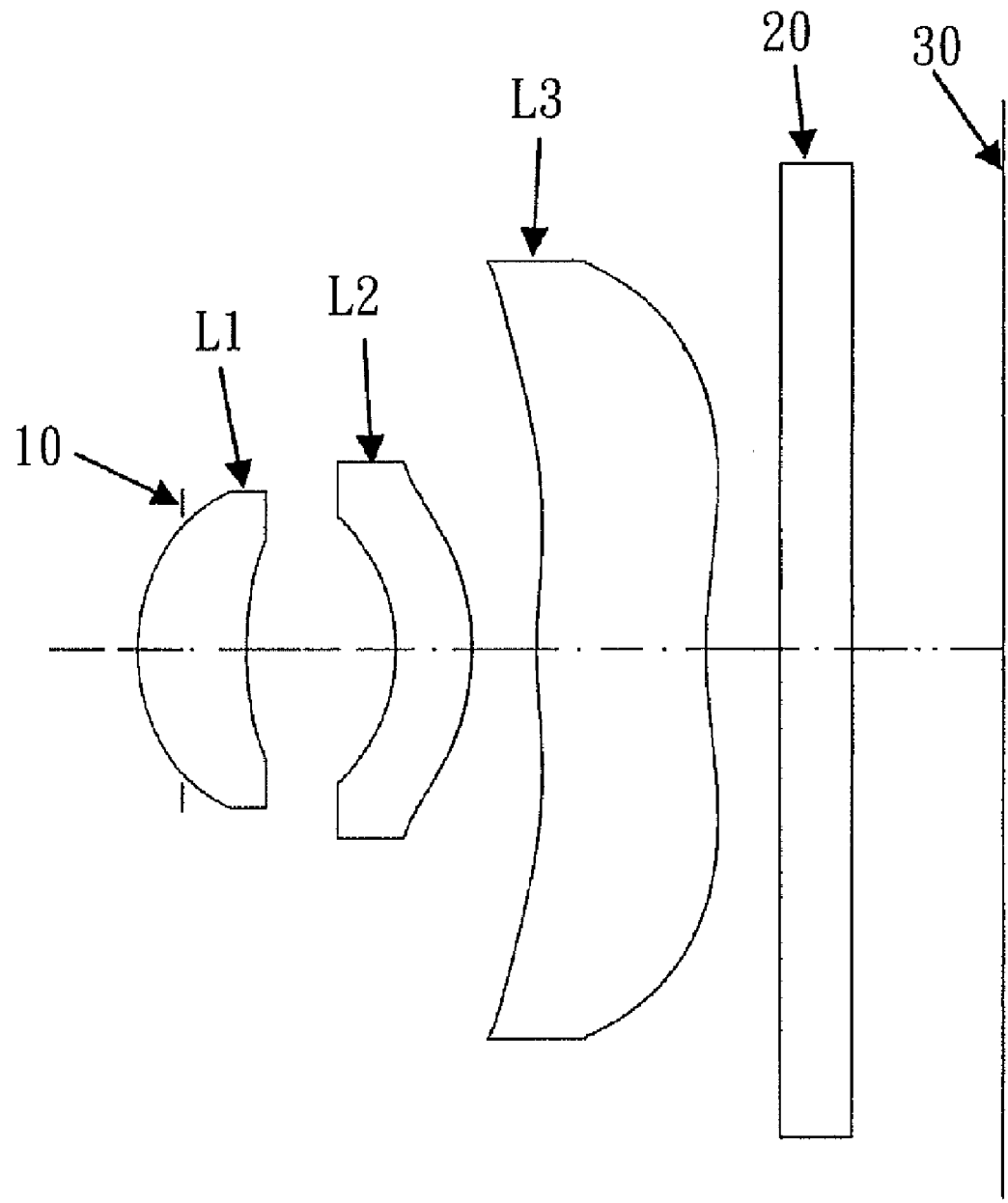
FIG. 6A shows an image lens array in accordance with a sixth embodiment of the present invention.
Figure 6B:
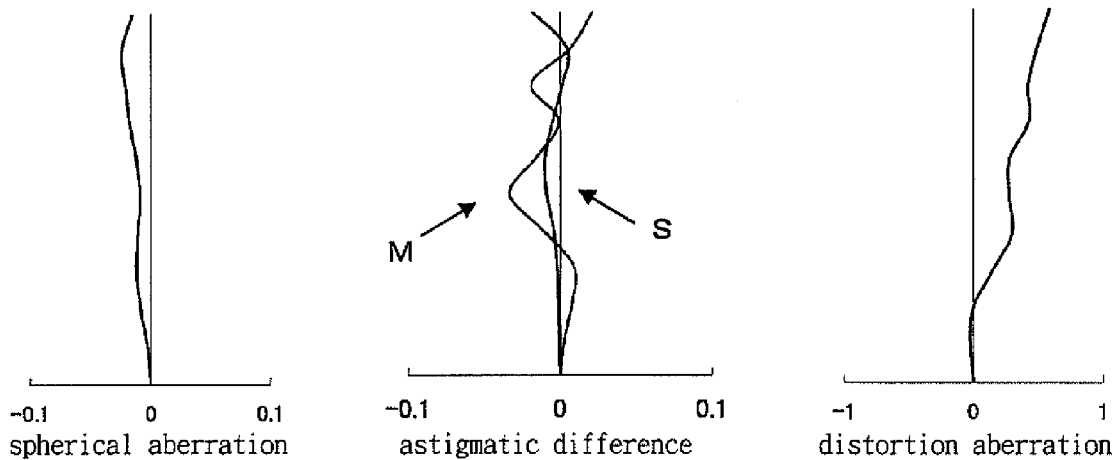
FIG. 6B shows the real numerical values of the respective lens of the sixth embodiment.
Figure 7A:
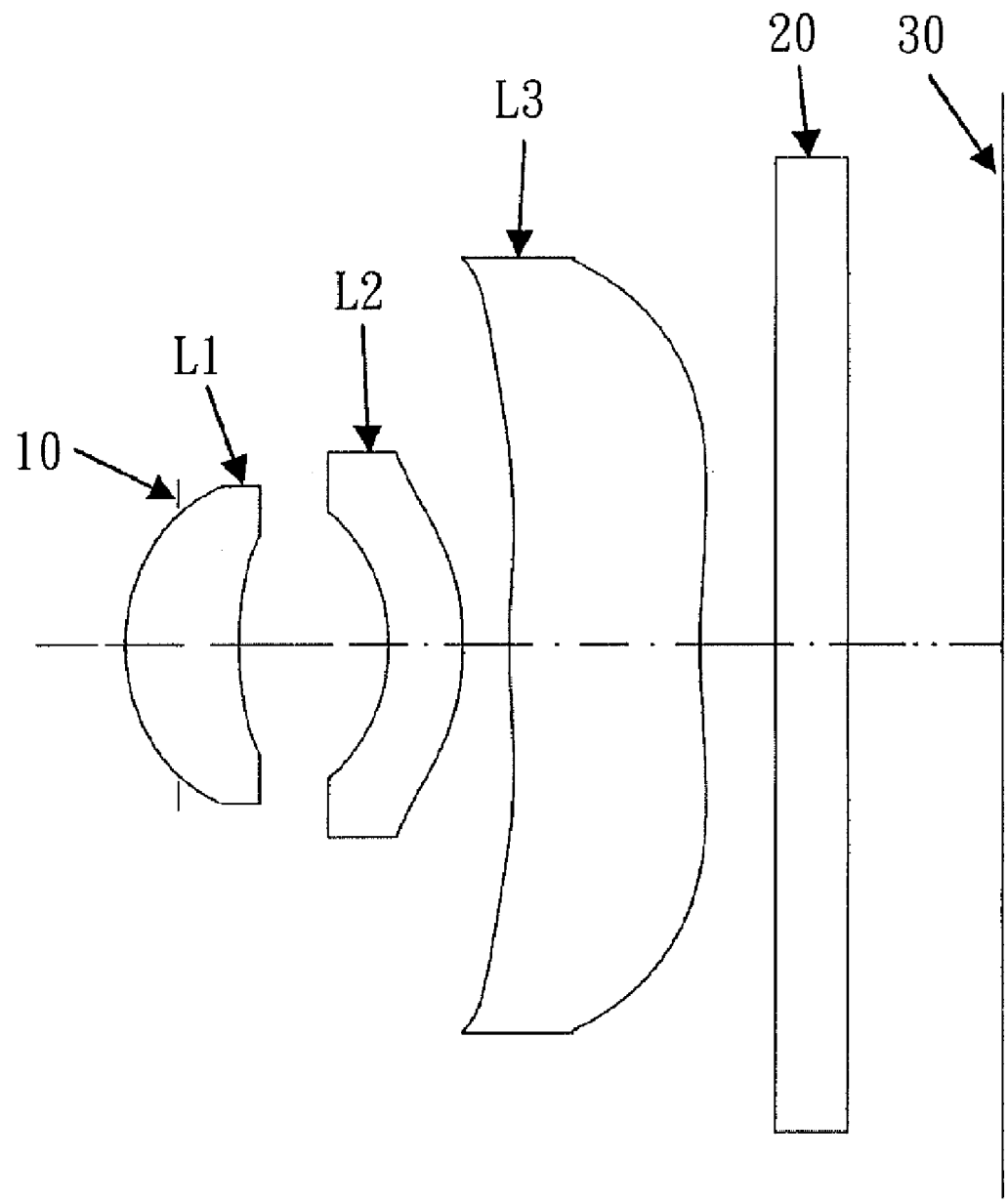
FIG. 7A shows an image lens array in accordance with a seventh embodiment of the present invention.
Figure 7B:
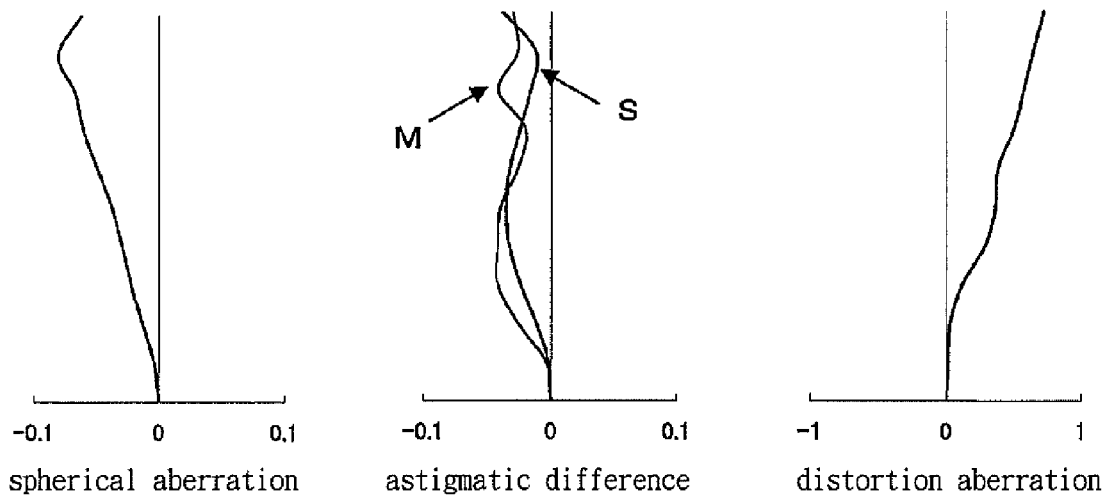
FIG. 7B shows the real numerical values of the respective lens of the seventh embodiment.
Figure 8A:
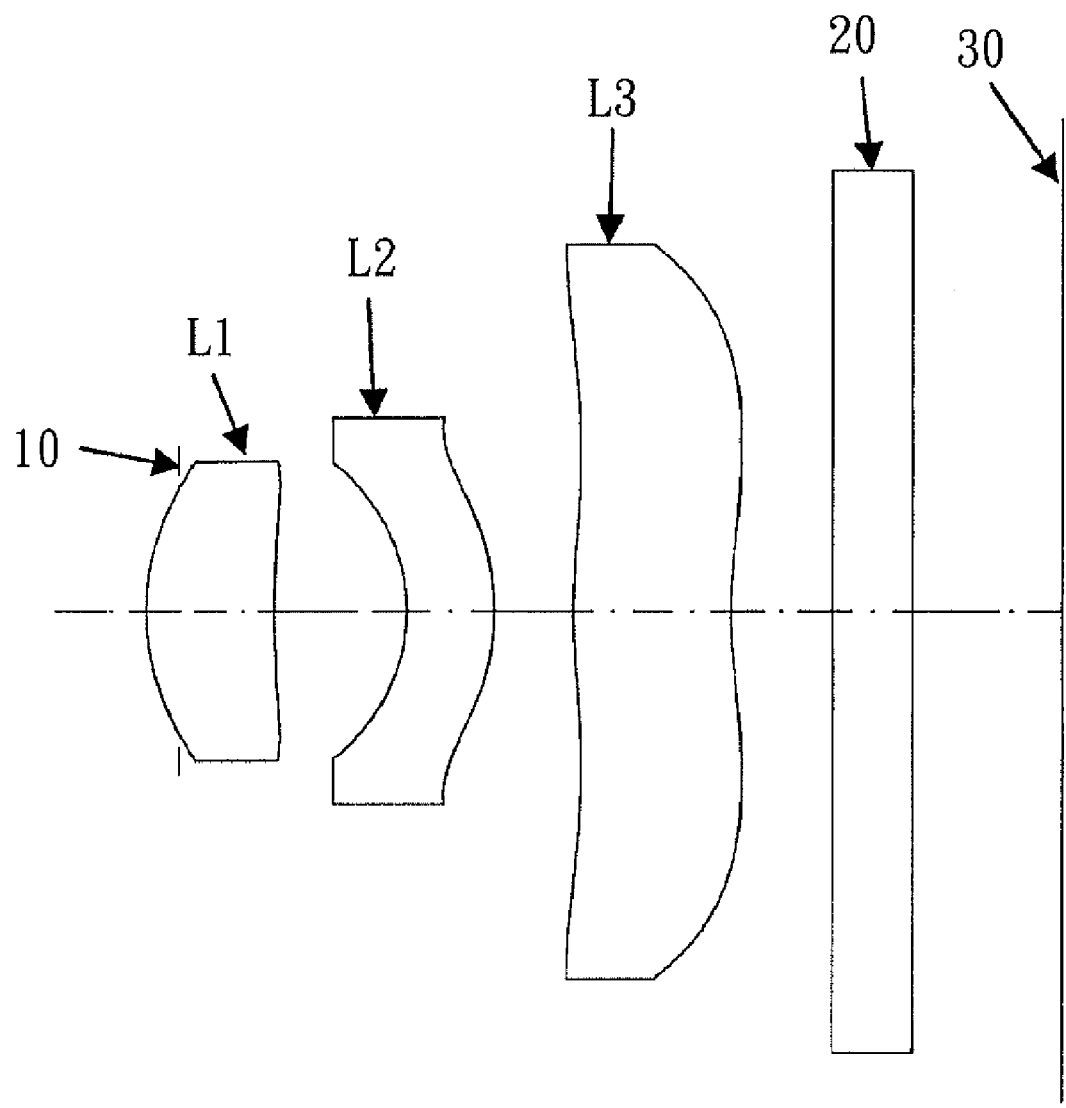
FIG. 8A shows an image lens array in accordance with a seventh embodiment of the present invention.
Figure 8B:
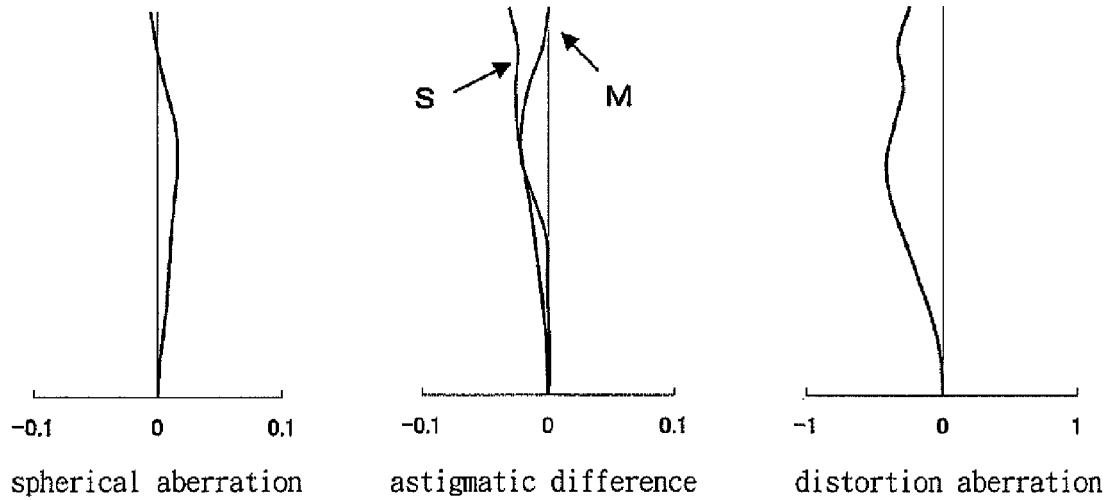
FIG. 8B shows the real numerical values of the respective lens of the seventh embodiment.

Referring to FIGS. 1-8, which show the optical lens systems (FIGS. 1A-8A) and the optical characteristic information and aberration correction (FIGS. 1B-8B) in accordance with respective preferred embodiments 1-8. While FIGS. 9A-9C show the aspheric information in accordance with respective preferred embodiments. The prevent invention adopts a three-piece lens system, which can be placed in the optical system of a digital camera or a mobile phone.

FIGS. 1A-8A show the different optical arrangements of the optical lens system in accordance with the respective preferred embodiments. The optical lens systems of the respective embodiment comprises, successively from the object side along the optical axis: an aperture stop 10, a first lens element L1, a second lens element L2, a third lens element L3, a parallel flat glass 2, and an imaging plane 3.

The first lens element L1 is a positive meniscus plastic lens element with its convex surface facing the object side, and both surfaces of the first lens element are aspheric.

The second lens element L2 is a negative meniscus plastic lens element with its convex surface facing the image side, and both surfaces of the second lens element are aspheric.

The third lens element L3 is a positive meniscus plastic lens element with its convex surface facing the object side, and both surfaces of the third lens element are aspheric.

The parallel flat glass 20 has an infrared filter function.

The imaging plane 3 is provided with CCD or CMOS device.

The first lens element L1, the second lens element L2 and the third lens element L3 are all made of the plastic material. As compared to the ordinary glass material, the material of the present invention is cheaper and the material management cost is relatively low. Furthermore, the respective surfaces of the first, second and third lens elements L1, L2, L3 are also aspheric, so that the three-piece lens system can ensure necessary optical performance. In addition, the lens elements are made of polycarbonate whose price is much cheaper, and the refraction index of the first lens element L1, the second lens element L2 and the third lens element L3 is smaller than 1.6, which is a better numerical value.

Referring to FIGS. 1B-8B, at the top of the figures are shown the various factors of the lens assembly, including focal length f, F Number, field of view 2ω. The Arabic numbers 1, 2, . . . 8 represent the sequence number of the surfaces of the respective lenses from the object side. Numbers 1 and 2 represent the front surface and the rear surface of the first lens element L1, respectively. Numbers 3 and 4 represent the front surface and the rear surface of the second lens element L2, respectively. Numbers 5 and 6 represent the front surface and the rear surface of the third lens element L3, respectively. While 8 and 9 represent both sides of the parallel flat glass 2 whose radius of curvature r is 8. In addition, an aperture stop 10 is disposed before the front surface 1 of the first element L1.

The r represents the paraxial radius of curvature (its unit is mm); d represents the thickness of the lens elements and its unit is mm; nd means the refractive index and vd means Abbe number.

Moreover, the respective figures also show the spherical aberration, the astigmatic difference and the distortion aberration of the respective embodiments. The data of the d line is shown in each of the drawings, and the astigmatic difference indicates the data of the (S) plane and the (M) plane. And it can be seen form these figures that the aberration compensation of the present invention is ok.

The abovementioned either surface of each lens element is aspheric-shaped. The aspherical coefficients of the respective lenses are indicated by A, B, C D and E, the height of the optical axis is H, and the deflection of the optical axis is X, and then a formula will be satisfied:

$$X=(1/R)H^2/\{1+[1-(1+K)(H/R)^2]^{1/2}\}+AH^2+BH^6+CH^8+DH^{10}+EH^{12}$$

The capital R in this formula represents the paraxial radius of curvature, K represents the conical coefficients, the aspherical coefficient E-03 represents $10^{-3}$.

The focal length of the optical lens system is f, the focal length of the first lens element L1 is f1, and they satisfy the relation: $0.7<f1/f<0.9$.

According to the above relation, if the value of f1/f is smaller than 0.7, the refractive power of the first lens element L1 will become too strong, and the multiple power of spherical aberration and coma aberration will not be good, while if the value of f1/f is higher than 0.9, the positive refractive power of the second lens element L2 will become weak, and the total length of the optical lens system will become too long.

The focal length of the optical lens system is f, the focal length of the second lens element L2 is f1, and they satisfy the relation: $-3.5<f1/f<-1.2$.

If the value of f2/f is higher than −1.2, the image aberration will not be good, and the aberration cannot be corrected effectively.

The focal length of the optical lens system is f, and the distance between the first lens element L1 and the second lens element L2 is d2, and they satisfies the relation: $0.10<d2/f<0.25$.

If the value of d2/f is smaller than 0.1, the distance between the first lens element L1 with positive refractive power and the second lens element L2 with negative refractive power will become narrow; the even off axis performance will not be good and the aberration can not be corrected effectively.

If the value of d2/f is higher than 0.25, the distance between the first lens element L1 and the second lens element L2 will become wide, and the outer diameter of the third lens element L3 accordingly becomes large, so that the requirement of miniaturization can not be satisfied. In addition, the coma flare also becomes large.

The radius of curvature of the object side surface of the first lens element L1 is R1, and the radius of curvature of the image side surface of the first lens element L1 is R2, and they satisfy the relation: $0.20<R1/R2<0.55$.

If the value of R1/R2 is smaller than 0.2, the spherical aberration will become large, and the back focal length will become longer than necessary. If the value of R1/R2 is higher than 0.55, the back focal length will become short, so that the characteristic of the incident angle will not be good.

The radius of curvature of the object side surface of the second lens element L2 is R3, and the radius of curvature of the image side surface of the second lens element L2 is R4, and they satisfy the relation: $0.6<R3/R4<0.8$.

If he value of R3/R4 is smaller than 0.6, the image plane will curve, and the coma aberration will be excessively corrected, so that the performance of the optical lens system will become worse.

If he value of R3/R4 is higher than 0.8, the image plane will curve, and the coma aberration will be not sufficiently corrected, so that the off axis performance will not be good.

The focal length of the optical lens system is f, the radius of curvature of the object side surface of the third lens element L3 is R5, and they satisfy the relation: $0.6<R5/f<1.1$.

If the value of R5/f is smaller than 0.6, the radius of curvature of the object side surface of the third lens element L3 will become too small, and the periphery of the third lens element forms a shape that leans to the image side ' so that the back focal length can not be ensured. In addition, such shape will render the reflection between both surfaces of the lens elements to become so strong that ghost is likely to happen. If the value of R5/f is higher than 1.1, the characteristic of the incident angle will not be good, if it is corrected, the coma aberration will be worse.

The focal length of the optical lens system is f, a combined focal length of the first lens element L1 and the second lens element L2 is f12, and the satisfy the relation: $1.0<f12/f<1.4$.

If the value of f12/f is smaller than 1.0, combined refractive power of the first lens element L1 and the second lens element L2 will become too strong, and the back focal length will become short. In addition, the characteristic of the incident angle will not be good. If the value of f12/f is higher than 1.4, the characteristic of the incident angle will become better because the exit pupil of the optical lens system will be far away from the image plane, but the field of view will become narrow.

The focal length of the second lens element L2 is f2, the focal length of the third lens element L3 is f3, and they satisfy the relation: $-0.5<f2/f3<0.0$.

If the value of f2/f3 is smaller than −0.5, the negative refractive power of the second lens element will become too strong, so that equalization of chromatic aberration of magnification cannot be achieved.

If the value of f2/f3 is higher than 0.0, the positive refractive power of the third lens element L3 will disappear, and the characteristic of the incident angle will become not good.

What follows are the parameters of the conditional expression of the respective embodiments:

|  | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| f1/f = | 0.79 | 0.78 | 0.82 | 0.74 | 0.75 | 0.80 | 0.76 | 0.74 |
| f2/f = | −2.39 | −2.27 | −3.19 | −2.08 | −1.53 | −2.61 | −1.63 | −2.08 |
| d2/f = | 0.20 | 0.15 | 0.19 | 0.16 | 0.18 | 0.19 | 0.18 | 0.16 |
| R1/R2 = | 0.36 | 0.47 | 0.43 | 0.24 | 0.34 | 0.49 | 0.50 | 0.24 |
| R3/R4 = | 0.72 | 0.71 | 0.76 | 0.70 | 0.66 | 0.74 | 0.67 | 0.70 |
| R5/f = | 0.98 | 0.97 | 0.77 | 0.68 | 0.98 | 0.73 | 0.81 | 0.67 |
| f12/f = | 1.20 | 1.11 | 1.12 | 1.13 | 1.28 | 1.12 | 1.18 | 1.13 |
| f2/f3 = | −0.38 | −0.13 | −0.07 | −0.10 | −0.45 | −0.04 | −0.27 | −0.10 |
| T/f = | 1.13 | 1.05 | 1.07 | 1.09 | 1.13 | 1.05 | 1.02 | 1.09 |
| a = | 23.2° | 25.3° | 25.1° | 23.9° | 23.0° | 25.1° | 25.1° | 23.9° |
| 2 ω = | 67.5° | 66.5° | 71.1° | 64.6° | 66.2° | 69.4° | 68.7° | 63.2° |

Based on the optical system of the present invention, the magnification T/f (T is the length of the imaging plane (surface No 1) of the object side surface of the first lens group L1) can be lower than 1.15, and the miniaturization can be accomplished as compared to the existing technology. Moreover, as for the characteristic of the incident angle, it can be ensured that the maximum incident angle a of the image lens assembly is smaller than 25°. And it is necessary to ensure that the inclination of the primary ray emitted from the optical lens system into the image taking device is within 15°. Currently, along with the development of the technology of the image taking device (the changes in the shape of the macro Lens elements), the incident angle can be lower than 25°, but the incident angle is 63° in any embodiment. The abovementioned embodiments can ensure the function of the present invention.

To sum up, the present invention relates to an optical lens system for taking image, from object side along the optical axis comprises: an aperture stop, a first lens element, a second lens element, and a third lens element. The first lens element is a positive meniscus lens element with its convex surface facing the object side. The second lens element is a negative meniscus lens element with its convex surface facing the image side. The third lens element is a positive meniscus lens element with its convex surface facing the object side. The three lens elements are made of plastic, and both surfaces of each lens elements are aspheric. The focal length of the optical lens system is f, the focal lens of the first lens element is f1, the focal length of the second lens system is f2, and they satisfy the relations: 0.7<f1/f<0.9 and −0.35<f2/f<−1.2. By such arrangements, the present invention can realize miniaturization and produce a small magnification, and using three-piece lens system can ensure the field of view.

While we have shown and described various embodiments in accordance with the present invention, it is clear to those skilled in the art that further embodiments may be made without departing from the scope of the present invention.

What is claimed is:

1. An optical lens system for taking image, from object side along the optical axis comprising: an aperture stop, a first lens element, a second lens element, and a third lens element, wherein:

the first lens element is a positive meniscus plastic lens element with its convex surface facing the object side;

the second lens element is a negative meniscus plastic lens element with its convex surface facing the image side; and the third lens element is a positive meniscus plastic lens element with its convex surface facing the object side; both surfaces of each lens elements are aspheric; a focal length of the optical lens system is f; a focal lens of the first lens element is f1; the focal length of the second lens system is f2; a radius of curvature of object side surface of the first lens element is R1, a radius of curvature of image side surface of the first lens element is R2, a radius of curvature of the object side surface of the second lens element is R3, and a radius of curvature of the image side surface of the second lens element is R4, and they satisfy the relations:

$0.7 < f1//f < 0.9$ $-3.5 < f2/f < -1.2$ $0.6 < R3/R4 < 0.8$ $0.20 < R1/R2 < 0.55.$

2. The optical lens system as claimed in claim 1, wherein the focal length of the optical lens system is f, and a distance between the first lens element and the second lens element is d2, and they satisfies the relation: $0.10 < d2/f < 0.25$.

3. The optical lens system as claimed in claim 1, wherein the focal length of the optical lens system is f, a radius of curvature of the object side surface of the third lens element is R5, and they satisfy the relation: $0.6 < R5/f < 1.1$.

4. The optical lens system as claimed in claim 1, wherein the focal length of the optical lens system is f, a combined focal length of the first lens element and the second lens element is f12, and the satisfy the relation: $1.0 < f12/f < 1.4$.

5. The optical lens system as claimed in claim 1, wherein the focal length of the second lens element is f2, a focal length of the third lens element is f3, and they satisfy the relation: $-0.5 < f2/f3 < 0.0$.

* * * * *